United States Patent [19]

Schlangen

[11] Patent Number: 5,472,250
[45] Date of Patent: Dec. 5, 1995

[54] DEVICES FOR EXTENDING THE HANDLE OF IMPLEMENTS AND FOR COUPLING THERETO HYGIENE DEVICES, GROOMING AIDS AND LIKE COMPONENTS

[76] Inventor: Steven J. Schlangen, 22 Hillside Dr., Raymond, N.H. 03077

[21] Appl. No.: 216,352

[22] Filed: Mar. 23, 1994

[51] Int. Cl.⁶ .......................................................... B25J 1/00
[52] U.S. Cl. .......................................... 294/19.1; 294/99.1
[58] Field of Search ............................... 294/19.1, 22–24, 294/99.1; 15/143.1, 145, 146, 167.1, 176.6; 16/111 R, 114 R, 115; 30/322–324, 327; 74/544; 81/177.2, 487, 489; 623/57, 65, 66

[56] References Cited

U.S. PATENT DOCUMENTS

| | | | |
|---|---|---|---|
| 986,771 | 3/1911 | Siegel et al. | 294/22 |
| 2,716,043 | 8/1955 | Baril | 294/22 X |
| 4,683,610 | 8/1987 | Richards et al. | 16/115 |
| 4,715,080 | 12/1987 | Rydzicki | 15/146 |
| 4,953,905 | 9/1990 | Cohen | 294/19.1 |

FOREIGN PATENT DOCUMENTS

| | | | |
|---|---|---|---|
| 553928 | 6/1957 | Italy | 294/22 |
| 456013 | 7/1968 | Switzerland | 294/19.1 |

Primary Examiner—Johnny D. Cherry

[57] ABSTRACT

A device for extending the handle of implements and for coupling thereto hygiene devices, grooming and like components comprising an elongated support member formed of a thin strip of metallic material of a generally rigid nature, the support member having planar front and rear surfaces of a limited width, and having a front operational end and a rear operator-controlled end, a handle secured over the rear end for being held by the user, and a plurality of apertures extending centrally through the support member adjacent to the front end for supporting clips; and a plurality of clips, each clip formed with a planar section having gripping teeth at the far ends normally together and diverging surfaces terminating at widely spaced near ends with an aperture extending through each near end, the aperture at the rear end being of essentially the same size as the aperture through the support member, each clip also including a generally cylindrical resilient member tending to hold the planar sections of the clip with the far ends together and remaining extents diverging until force is applied to the rear ends to urge the gripping teeth away from each other in opposition to the resilience of the resilient member.

4 Claims, 3 Drawing Sheets

DEVICES FOR EXTENDING THE HANDLE OF IMPLEMENTS AND FOR COUPLING THERETO HYGIENE DEVICES, GROOMING AIDS AND LIKE COMPONENTS

BACKGROUND OF THE INVENTION

1. Field of the Invention

The present invention relates to devices for extending the handle of implements and for coupling thereto hygiene devices, grooming aids and like components and more particularly pertains to extending the utility of hygiene devices, grooming aids and like components for people with limited use of their arms and hands.

2. Description of the Prior Art

The use of extended devices and the like is known in the prior art. More specifically, extended devices and the like heretofore devised and utilized for the purpose of extending the handles of various tools and implements are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,325,157 discloses an extension handle for a tool such as a paint roller, paint pad or the like.

U.S. Pat. No. 4,683,610 discloses an extension handle of a tool or similar device including a hollow cylindrical shaped tube.

U.S. Pat. No. 4,715,080 discloses an attachment for holding and adjustably positioning a brush.

U.S. Pat. No. 4,729,281 discloses an extension handle apparatus for use with a conventional wrench.

U.S. Pat. No. 4,905,372 discloses a razor handle extension adapted to be detachably connected to the handle of a disposable razor to increase the length of the handle.

U.S. Pat. No. Des. 328,017 discloses an ornamental design for an extension handle for wrenches.

In this respect, the device for extending the handle of implements and for coupling thereto hygiene devices, grooming and like components according to the present invention substantially departs from the conventional concepts and designs of the prior art, and in doing so provides an apparatus primarily developed for the purpose of extending the utility of grooming devices, eating implements and like components for people with limited use of their arms and hands and like components.

Therefore, it can be appreciated that there exists a continuing need for new and improved device for extending the handle of implements and for coupling thereto hygiene devices, grooming and like components which can be used for extending the utility of grooming devices, eating implements and like components for people with limited use of their arms and hands. In this regard, the present invention substantially fulfills this need.

SUMMARY OF THE INVENTION

In view of the foregoing disadvantages inherent in the known types of extended devices and the like now present in the prior art, the present invention provides an improved device for extending the handle of implements and for coupling thereto hygiene devices, grooming and like components. As such, the general purpose of the present invention, which will be described subsequently in greater detail, is to provide a new and improved device for extending the handle of implements and for coupling thereto hygiene devices, grooming and like components and method which has all the advantages of the prior art and none of the disadvantages.

To attain this, the present invention essentially comprises a new and improved device for extending the handle of implements and for coupling thereto hygiene devices, grooming and like components comprising, in combination, an elongated support member formed of a thin strip of metallic material of a generally rigid nature, the support member having planar front and rear surfaces of a limited width, and having a front operational end and a rear operator-controlled end, a foam handle secured over the rear end for being held by the user, and a plurality of apertures extending centrally through the support member adjacent to the front end for supporting clips; a plurality of clips, each clip formed with planar sections having gripping teeth at the far ends normally together and diverging surfaces terminating at widely spaced near ends with an aperture extending through each near end, the aperture at the rear end being of essentially the same size as the aperture through the support member, each clip also including a generally cylindrical resilient member tending to hold the planar sections of the clip with the far ends together and remaining extents diverging until force is applied to the rear ends to urge the gripping teeth away from each other in opposition to the resilience of the resilient member; a pair of ridges on the rear ends of the planar section of each clip, the ridges being parallel and spaced from the near ends a distance substantially equal to half the width of the support member to preclude rotational motion therebetween when coupled for operation and use; and a plurality of bolts and associated nuts for coupling the clips to the support member either in alignment therewith or transverse with respect thereto whereby hygiene implements, food utensils and like elements may be held by the clip and manipulated during use by a user holding the handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved devices for extending the handle of implements and for coupling thereto hygiene devices, grooming and like components which have all the advantages of the prior art extended devices and the like and none of the disadvantages.

It is another object of the present invention to provide new and improved devices for extending the handle of implements and for coupling thereto hygiene devices, grooming and like components which may be easily and efficiently manufactured and marketed.

It is a further object of the present invention to provide new and improved devices for extending the handle of implements and for coupling thereto hygiene devices, grooming and like components which are of durable and reliable constructions.

An even further object of the present invention is to provide new and improved devices for extending the handle of implements and for coupling thereto hygiene devices, grooming and like components which are susceptible of a low cost of manufacture with regard to both materials and labor, and which accordingly are then susceptible of low prices of sale to the consuming public, thereby making such device for extending the handle of implements and for coupling thereto hygiene devices, grooming and like components economically available to the buying public.

Still yet another object of the present invention is to provide new and improved devices for extending the handle of implements and for coupling thereto hygiene devices, grooming and like components which provide in the apparatuses and methods of the prior art some of the advantages thereof, while simultaneously overcoming some of the disadvantages normally associated therewith.

Still another object of the present invention is to extend the utility of grooming devices, eating implements and like components for people with limited use of their arms and hands.

Lastly, it is an object of the present invention to provide new and improved devices for extending the handle of implements and for coupling thereto hygiene devices, grooming and like components comprising an elongated support member formed of a thin strip of metallic material of a generally rigid nature, the support member having planar front and rear surfaces of a limited width, and having a front operational end and a rear operator-controlled end, a handle secured over the rear end for being held by the user, and a plurality of apertures extending centrally through the support member adjacent to the front end for supporting clips; and a plurality of clips, each clip formed with a planar section having gripping teeth at the far ends normally together and diverging surfaces terminating at widely spaced near ends with an aperture extending through each near end, the aperture at the rear end being of essentially the same size as the aperture through the support member, each clip also including a generally cylindrical resilient member tending to hold the planar sections of the clip with the far ends together and remaining extents diverging until force is applied to the rear ends to urge the gripping teeth away from each other in opposition to the resilience of the resilient member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
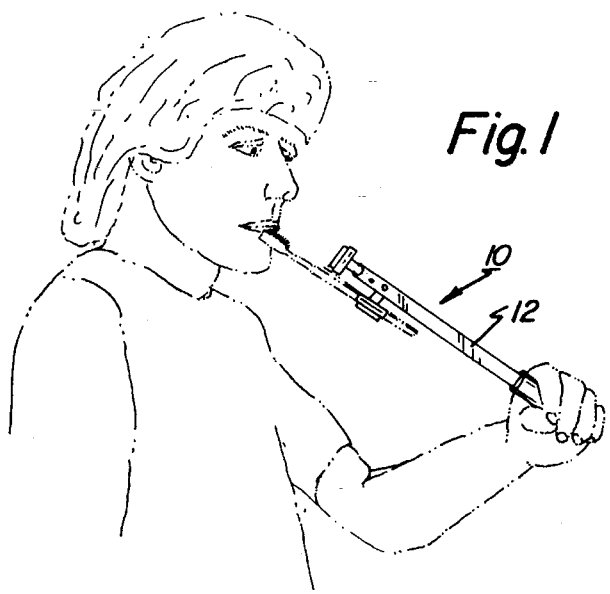
FIG. 1 is a perspective view of the preferred embodiment of the new and improved device for extending the handle of implements and for coupling thereto hygiene devices, grooming and like components constructed in accordance with the principles of the present invention.
Figure 2:
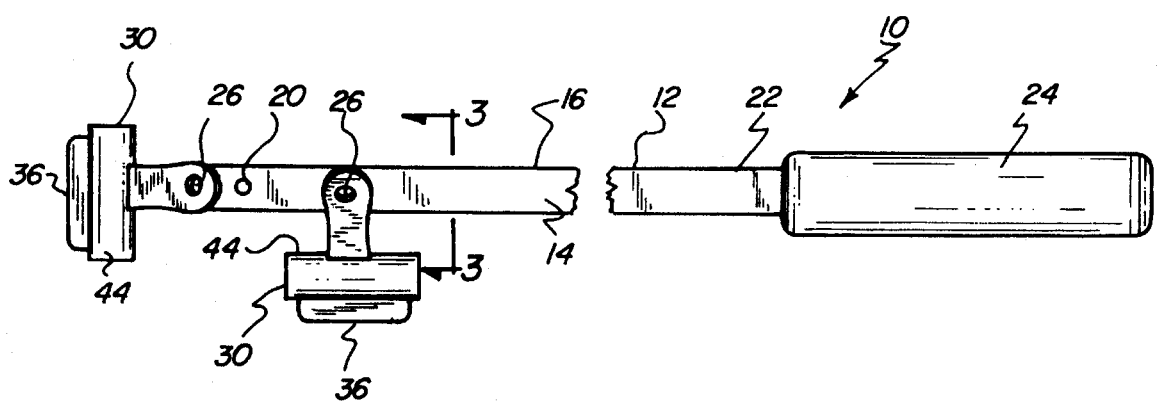
FIG. 2 is a top plan view of the device as shown in FIG. 1.
Figure 3:
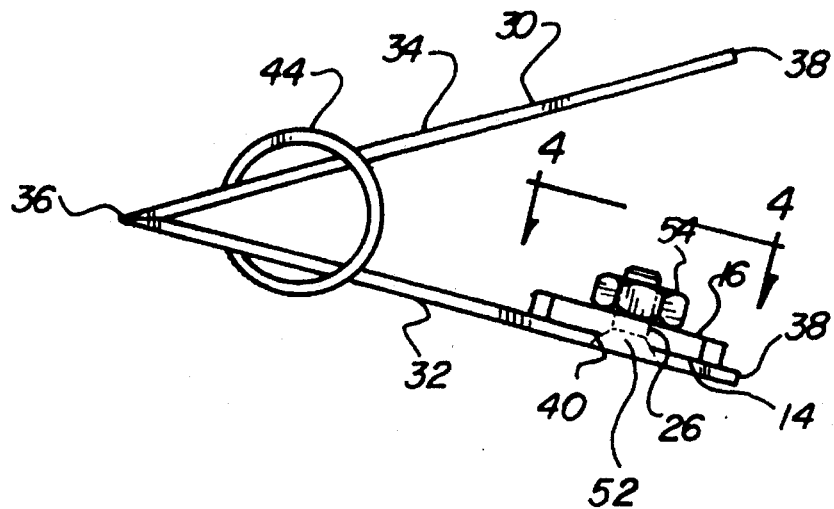
FIG. 3 is a cross sectional view taken along lines 3—3 of FIG. 2.
Figure 4:
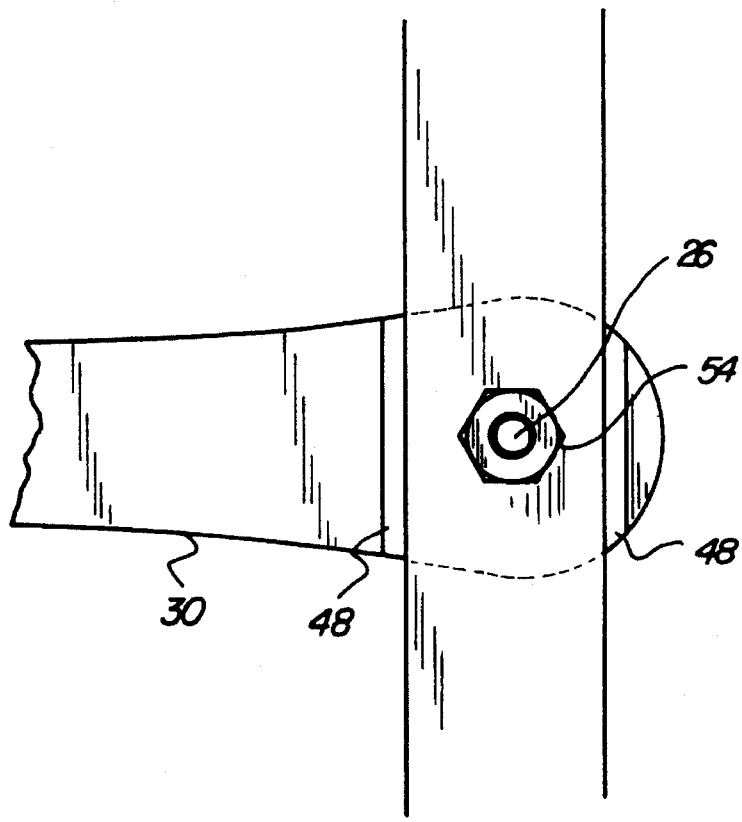
FIG. 4 is a cross sectional view taken along lines 4—4 of FIG. 3.
Figure 5:
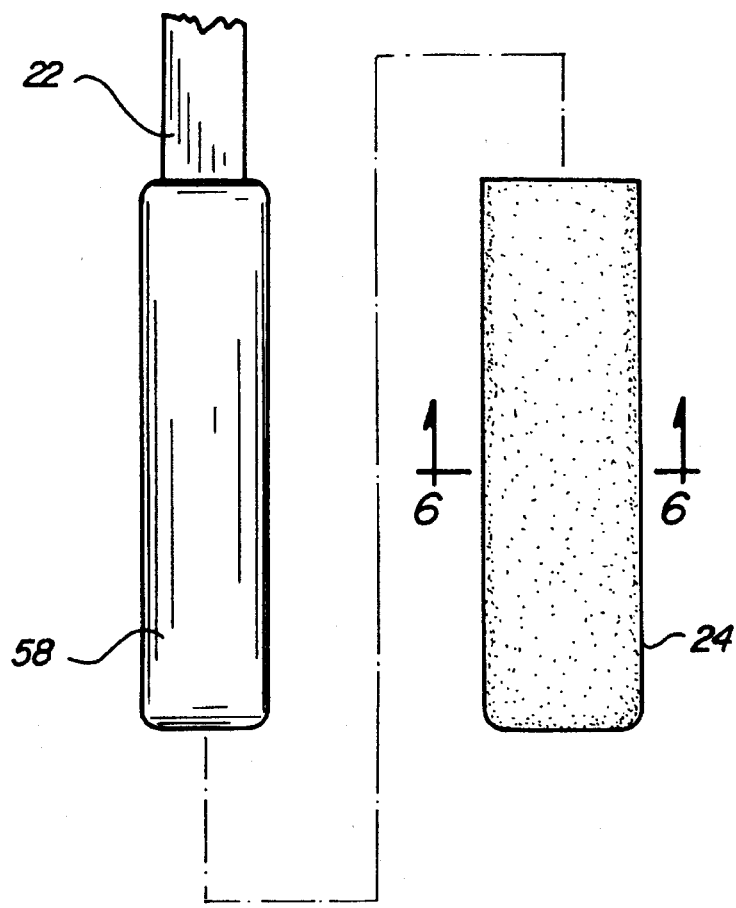
FIG. 5 is an exploded front elevational view of the handle located over the end of the device of the prior Figures.
Figure 6:
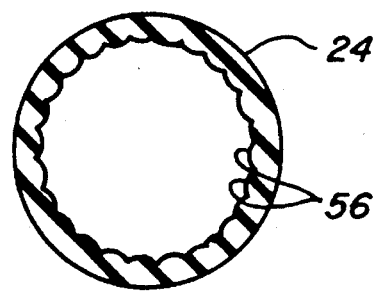
FIG. 6 is a cross sectional view taken along lines 6—6 of FIG. 5.

With reference now to the drawings, and in particular to FIG. 1 thereof, the preferred embodiment of the new and improved devices for extending the handle of implements and for coupling thereto hygiene devices, grooming and like components embodying the principles and concepts of the present invention and generally designated by the reference numeral 10 will be described.

Specifically, the present invention, the new and improved devices for extending the handle of implements and for coupling thereto hygiene devices, grooming aids and like components comprises a plurality of individual components. In their broadest context, such components include an elongated support member, a plurality of clips, ridges on the clips and bolts with associated nuts. The individual components are specifically configured and correlated one with respect to the other so as to achieve the intended objectives.

More specifically, the primary component of the present invention is an elongated support member 12. Such support member is formed of a thin strip of metallic material. It is generally rigid in nature. The support member has a planar front surface 14 and rear surface 16. The surfaces are of a limited width and thin.

The support member has a front operational end 20 and a rear operator controlled end 22. In addition, a foam handle 24 of an elastomeric foam material is slidably secured over the rear end of the support member. The purpose is for being held by the user. In addition, the elongated support member includes a plurality of apertures 26. The apertures extend centrally through the support member adjacent to the front end. The function of the apertures is for supporting clips as will later be described.

The next major component of the system is a plurality of clips 30. Each clip is formed with planar sections 32 and 34. The planar sections have gripping teeth 36 at the far ends. Such gripping teeth at far ends are normally held together by a resilient force. The planar sections are diverging surfaces which terminate at widely spaced near ends 38. In addition, an aperture 40 extends through each near end. The aperture at each near end is of essentially the same size as the apertures through the support member.

Each clip also includes a generally cylindrical resilient member 44. The resilient member has free ends in contact with a central extent of each planar section. The resilient member tends to hold the planar sections of the clip with the far ends together during operation and use. The remaining extents are configured to be diverging until force is applied to the rear ends. Such force functions to urge the gripping teeth away from each other in opposition to the resilient forces of the resilient member.

Proper positioning of the clips with respect to the support member is effected through a pair of ridges 48 on the near ends of the planar section of each clip. The ridges are parallel with each other and spaced from the apertures 40 a distance substantially equal to half the width of the support member.

Coupling between the clips and support member is through a plurality of bolts 52 and associated nuts 54. Such bolts extend through the apertures of the clips and support member and are secured thereto by their associated nuts. In this manner, hygiene implements, food utensils and the like may be held by the various clips to the side or front of the support device for use by a user holding the handle 24 of the device.

One last feature of the device is the interior surface of the foam handle 24. Such foam handle is provided with axial recesses 56 to ensure proper coupling thereof to the enlarged portion 58 at the handle end of the handle being grasped by the user.

The present invention is a versatile tool which can be utilized by people on either a temporary or permanent basis. The population that would ideally be targeted include arthritis patients, people diagnosed with cerebral palsy, body builders, amputees and burn patients.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An extendable device for hygiene, grooming and like components comprising, in combination:

an elongated support member formed of a thin strip of metallic material of a generally rigid nature, the support member having planar front and rear surfaces of a limited width, and having a front operational end and a rear operator-controlled end, a foam handle secured over the rear end for being held by the user, and a plurality of apertures extending centrally through the support member adjacent to the front end for supporting clips;

a plurality of clips, each clip having a near end and a far end and formed with planar sections having gripping teeth at each far end normally together and diverging surfaces terminating at widely spaced near ends with an aperture extending through each near end, the aperture at each near end being of essentially the same size as the apertures through the support member, each clip also including a generally cylindrical resilient member tending to hold the planar sections of the clip with the far ends together and remaining extents diverging until force is applied to the near ends to urge the gripping teeth away from each other in opposition to the resilience of the resilient member;

a pair of ridges on the near end of the planar section of each clip, the ridges being parallel and spaced from the apertures through the support member a distance substantially equal to half the width of the support member to preclude rotational motion therebetween when coupled for operation and use; and a plurality of bolts and associated nuts for coupling the clips to the support member either in alignment therewith or transverse with respect thereto whereby hygiene implements, food utensils and like elements may be held by the clips and manipulated during use by a user.

2. An extendable device for hygiene, grooming and like components comprising:

an elongated support member formed of a thin strip of metallic material of a generally rigid nature, the support member having planar front and rear surfaces of a limited width, and having a front operational end and a rear operator-controlled end, a handle secured over the rear end for being held by the user, and a plurality of apertures extending centrally through the support member adjacent to the front end for supporting clips; and a plurality of clips, each clip having a near end and a far end and formed with a planar section having gripping teeth at each far end normally together and diverging surfaces terminating at widely spaced near ends with an aperture extending through each near end, the aperture at the near end being of essentially the same size as the apertures through the support member, each clip also including a generally cylindrical resilient member tending to hold the planar sections of the clip with the far ends together and remaining extents diverging until force is applied to the rear ends to urge the gripping teeth away from each other in opposition to the resilience of the resilient member.

3. The device as set forth in claim 2 and further including:

a pair of ridges on the near ends of the planar section of each clip, the ridges being parallel and spaced from the aperture of each respective planar section a distance substantially equal to half the width of the support member to preclude rotational motion therebetween when coupled for operation and use.

4. The device as set forth in claim 2 and further including:

a plurality of bolts and associated nuts for coupling the clips to the support member either in alignment therewith or transverse with respect thereto whereby hygiene implements, food utensils and like elements may be held by the clips and manipulated during use by a user.

* * * * *